3,343,953
SELF-LUBRICATING STRUCTURE
Hermann Schladitz, Ruffinistrasse 12–14,
Munich 19, Germany
No Drawing. Filed Aug. 11, 1964, Ser. No. 388,927
Claims priority, application Germany, Aug. 24, 1963,
Sch 33,753
5 Claims. (Cl. 75—206)

This invention relates to improved self-lubricating sliding and bearing materials comprising a dry lubricant such as metal sulfides, metal oxides, graphite, or the like and to methods of manufacture of such materials.

In the past, dry lubricants have been used for reducing friction between sliding surfaces where oil or grease cannot be used for one reason or another, or where self-lubricating properties are desired. Dry lubricants are preferably selected from materials which have glidable crystal lattice planes and in which these lattice planes arrange themselves in parallel relative to the gliding plane. Thus materials such as metal sulfides are used with which a bond to the metal of the sliding surface is effected by the secondary valences of the sulphur atoms. In this manner the metal surface which has a certain roughness even after high grade polishing is smoothened.

Coating sliding surfaces such as bearings, pins, or tooth flanks, with these dry lubricants has only a limited effect inasmuch as the sliding films formed in this way are continuously consumed and destroyed. Therefore, it has been proposed to insert the dry lubricants into the material forming the sliding surface in form of depots which serve as a lubricant source and from which the sliding film is continuously made up. These depots are tapped or consumed when owing to cracking of the sliding film, the material forming the sliding surfaces is subject to wear.

The main difficulty with this approach resides in the fact that the depots of lubricant must be incorporated in a material which fulfills the demands with respect to mechanical strength and to high temperature resistance. On the other hand, the dry lubricant must be incorporated in the surrounding material in such manner that it is taken from the depots economically and only in such amounts as is necessary to make up the sliding film. Heretofore, these problems could be resolved only partially. If a material is used which fulfills the demands of mechanical and high temperature strength (such as metal skeletons produced by sintering, into the pores or cavities of which the dry lubricants are inserted during the pressing process or afterwards), it is not possible to get a sufficient fixture of the lubricant in the surrounding supporting skeleton. When such depots are scratched the lubricant will escape in too short a time and in too large an amount which can result in clamping of lubricant particles between the sliding surfaces and consequent deterioration of their sliding properties. Following this the supply of lubricant is discontinued as the depots are emptied by the premature drain of the lubricant. Only until the metal skeleton is worn to such an extent that lubricant depots lying deeper are scratched, lubrication is again provided and the described procedure is repeated. This method consequently leads to high material wear and a premature deformation of the sliding surfaces.

It has also been proposed to fix the lubricant in the pores of the metal skeletons by embedding the lubricant in non-metallic materials such as polytetrafluorethylene (Teflon) and by incorporating the lubricant together with its non-metallic carrier into the pores and cavities of the metal skeleton. Nevertheless, there remains insufficient affixation or adhesion of the lubricant with the supporting skeleton. An additional drawback lies in the limited thermal strength of the selected non-metallic materials.

In addition, the incorporation of the dry lubricants in non-metallic materials such as polytetrafluorethylene or suitable polyamides leads to the same drawbacks. Besides their low thermal strength, such materials lack the resistance against higher mechanical stresses, an assurance obtained only with metal skeletons. The same is true with the so-called sliding varnishes with which dry lubricants are admixed.

In order to effectively overcome the foregoing drawbacks the present invention proposes to coat the dry lubricants in the form of small particles with metal, and to form the sliding and bearing material by firm interconnection of these coated particles with each other. Organic or inorganic binding agents can be added if necessary or merely as a supplement for such purposes. Preferred coating materials are nickel, iron and molybdenum. By means of the coating process of this invention, a connection of the lubricant particles with the metal is obtained which is so adherent that the lubricant can be taken from the depot formed in this manner only in the same amount in which the surrounding metal is abrased by the created friction. This most important advantage of the invention can be explained as follows:

By deposition of metal on the surface of each lubricant particle metal capsules are formed which firmly enclose the lubricating medium. The lubricants are thereby held such that they cannot break out when the encapsulated metal hull is cut but they are continuously ground off in accordance with the demands for making up the lubricant film. If metal sulfides are used, a chemical bond of the secondary valences of the sulphur atoms with the metal coating additionally takes place. By this direct binding of the lubricant particles to the metal without organic intermediate members, a material is provided which has both high mechanical and thermal strength.

The coating of the lubricant particles with metal can for instance be effected by separation of metal out of the gaseous phase by means of thermal decomposition of metal compounds. An exemplary method which can be used for such purpose is described in my United States Letters Patent No. 2,698,812.

The interconnection of the individual metal-coated lubricant particles to form a compact structural material can be undertaken in different ways. According to one proposal of this invention, this conformation is effected by sintering. In this connection, metal powder may be admixed to the metal-coated lubricant particles. According to a second proposal the interconnection can be effected by hot-pressing or by cold-welding. Again metal powder may be admixed with the coated particles. Another approach in interconnecting the metal-coated particles consists in melting together adjacent metal-coated particles aided by the heat of recombination of unstable atomic gases wherein again metal powder can be added. Still another possibility for interconnecting the metal-coated particles consists in separating metals out of the gas phase of metal compounds whereby metal is by thermal decomposition of metal compounds deposited in the interspace between the single particles and thereby forms a metallic connection between the individual metal capsules. The metal-coated particles can be interconnected also by using chemical reactions, as, for example, by partial oxidation of the metal capsules while in pressed condition or by separation of easily fusible or easy-to-sinter metals within the pressed body from suitable additions of metal compounds. Still another possibility for interconnecting the metal-coated lubricant particles to form a compact material consists in glueing the particles by organic binding agents, for instance by epoxy resins. Under the circumstances, a firm binding between the lubricant and the metal on the one side and between the metal and the plastics on the other side is obtained, which prevents the lubricant particles from breaking out of the surrounding material.

The following are representative examples of the manufacture of sliding or bearing materials according to this invention that have performed satisfactorily:

Example I

Crystals of molybdenum disulfide having an average thickness of a few microns, were coated with nickel by thermal decomposition of nickel-tetracarbonyl both individually and in groups. The average thickness of the coating was in the order of at least one micron. The metal-coated particles are mixed with nickel powder having a granular size gain averaging a few microns. The mixture was by weight ratio of 70:30. The mixture is then pressed with a pressure of 4 to 8 tons/cm.$^2$, sintered for 30 minutes in vacuo at 650° C. and is thereafter again pressed with 4 to 8 tons/cm.$^2$.

Example II

Crystals of molybdenum disulfide having an average thickness of a few microns were individually coated with a metal coating of at least one micron thickness. The coating was obtained by thermal decomposition of nickel-tetracarbonyl in one case and iron-pentacarbonyl in another. In both cases, the metallized powder was pressed with 4 to 8 tons/cm.$^2$ and sintered in vacuo for 30 minutes at 650° C.

Example III

Metallized crystals of molybdenum disulfide obtained by the procedure of Examples I and II were mixed with powdered epoxy resin adhesive with a ratio in volume of 60:40 at low pressure. The mixture was hardened at 200° C.

The metal-coated dry lubricants which can have the shape of lamellas, grains or conglomerates are preferably very small in size. With a thickness in the region of a few microns and less than 1 micron, it is assured in most instances that only a small partial shearing force is exerted on the individual metallically bound lubricant particles whereby individual particles are prevented from being broken out of the surrounding material.

In order to increase the mechanical strength of the manufactured product, suitable metals such as carbonized iron, always in finest distribution, can be added. Silver may thusly be added to increase its thermal conductivity. For increasing the resistance against mechanical stresses, reinforcing can be incorporated, preferably simultaneously with the connection of the metal-coated lubricant particles. These reinforcements can assume the form of metal skeletons, lattices or very fine wires, for instance so-called whiskers. These reinforcements can at the same time serve to conduct away the heat from the sliding surfaces. For the same purpose metal parts which have a high heat conductivity, for instance metal laminas, can be incorporated preferably perpendicular to the plane of the sliding surface. Furthermore, in the materials according to the invention agents may be incorporated which have a good affinity for oil; and materials may be added which are able to hold abrasions, as for instance tin, lead or other soft metals or alloys. These agents can be incorporated in the shape of individual nodules which can beforehand be coated with other metals having higher strength.

The material structure proposed by the present invention can get their final shape either by the manufacturing process or they can afterwards by pressing or by cutting, turning or milling, be manufactured into the desired shapes. They can be used for all purposes for which self-lubricating properties are desirable or where lubricating oils or grease cannot be used, as for example, in textile machines, office machines, or for bearings and sliding surfaces with which the coefficient of friction should as far as possible be the same for static and for sliding friction. The materials according to the invention are especially useful for cages of antifriction bearings and for machine parts with extremely high sliding velocities, for instance seal strips of rotary mechanisms such as rotary engines, pumps or compressors, shaft bearings of large diameter and so on, and especially in cases where high temperature strength and resistibility against mechanical stresses is essential and where, therefore, carbon or plastics cannot be used.

The material proposed by the instant invention can be manufactured in thin flexible layers, films or strips by incorporating the lubricant particles in a frame work, for instance a thin bronze lattice, and by connecting the particles to the frame work by means of metallization as described above. The material formed in this way can then be rolled up to form rolls, the individual layers of which can be interconnected by one of the mentioned methods such as sintering, glueing or metal-ceramic process to form compact bodies. Such rolls can be used in the same manner as composite bearings for mounting in bearing bushings, if necessary after suitable processing.

Furthermore such layers can be glued to rigid supporting surfaces to form sliding surfaces. For such purposes the thickness of the layers can be very small and such layers can be made by rolling down to 0.05 mm. without impairing the qualities of the material.

Thus the aforenoted objects and advantages among others are most effectively attained. Under the circumstances, the scope of the invention is to be determined by the appended claims.

What I claim is:

1. A method of manufacturing self-lubricating materials for bearings and sliding parts comprising the steps of providing solid, finely divided, dry lubricant particles selected from the group consisting of metal sulfide, metal oxide and graphite with a capsule of metal having a thickness of a few microns to about 1 micron by thermally decomposing a metal carbonyl compound out of the gaseous phase and thereafter connecting the coated particles with each other to form a compact material by a joining step.

2. The invention in accordance with claim 1 wherein metal reinforcements are incorporated.

3. The invention in accordance with claim 1 wherein a material selected from the group consisting of iron and silver in finest distribution is added.

4. The invention in accordance with claim 1 wherein a material is incorporated which has a good affinity for oil.

5. The invention in accordance with claim 4 wherein a material is added having ressistance to abrasion.

References Cited

UNITED STATES PATENTS

| | | | |
|---|---|---|---|
| 2,246,462 | 6/1941 | Darby | 75—212 |
| 2,815,535 | 12/1957 | Bodine | 75—200 |
| 2,853,401 | 9/1958 | Mackiw | 75—212 X |
| 3,072,983 | 1/1963 | Brenner. | |
| 3,139,658 | 7/1963 | Brenner | 117—107.2 X |
| 3,214,270 | 10/1965 | Valyi | 75—201 |
| 3,258,514 | 6/1966 | Roach | 75—226 X |

FOREIGN PATENTS

| | | |
|---|---|---|
| 827,016 | 1/1960 | Great Britain. |

OTHER REFERENCES

Davis: "How to Deposit Metallic and Nonmetallic Coatings with the Plasma are Torch," Metal Progress, vol. 83, No. 3, March 1963, pp. 105–108.

BENJAMIN R. PADGETT, *Primary Examiner.*

CARL D. QUARFORTH, *Examiner.*

A. J. STEINER, *Assistant Examiner.*